March 2, 1926.
A. BOUSQUET
1,575,314
TOOL HOLDER
Filed Sept. 19, 1924
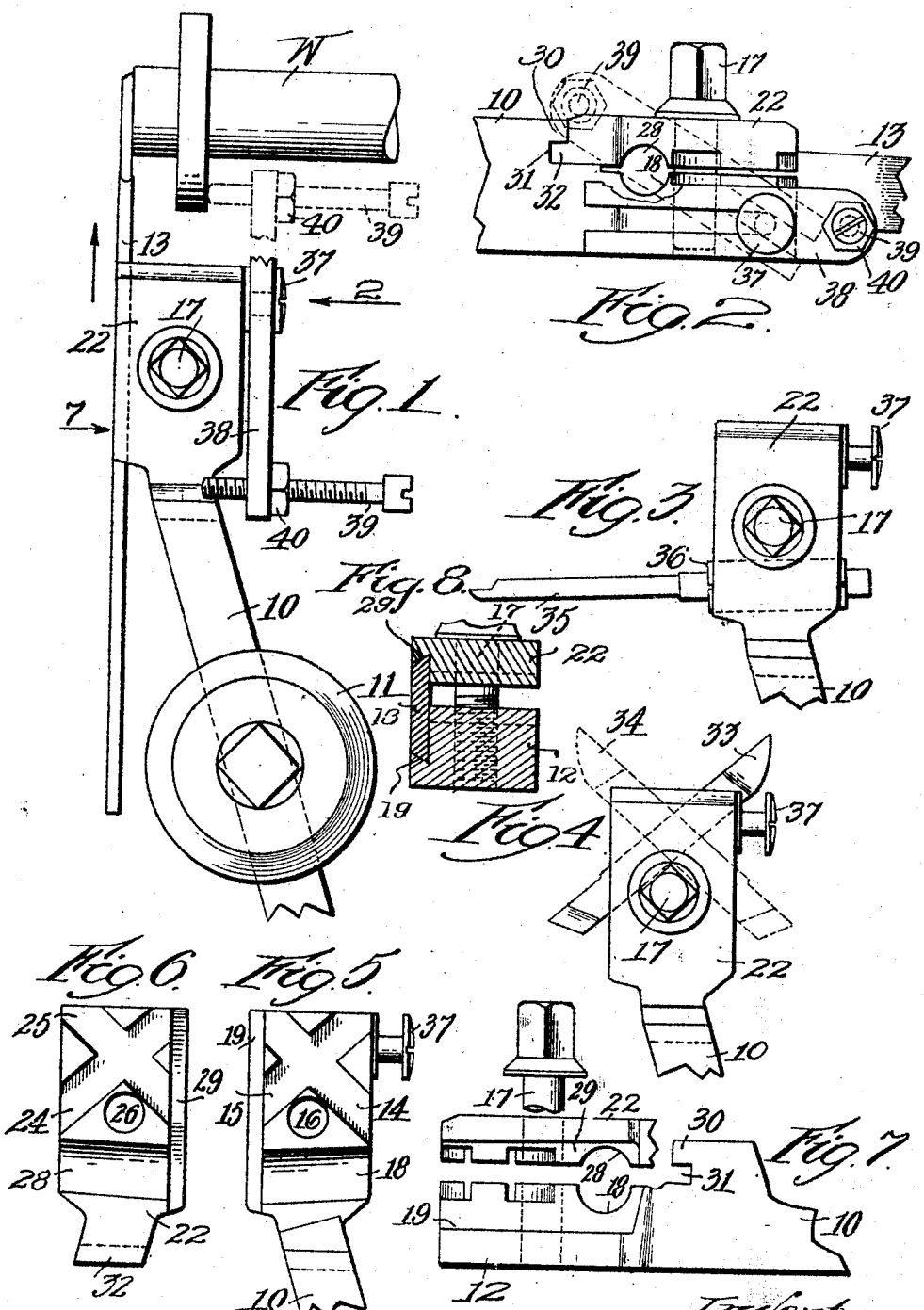

Patented Mar. 2, 1926.

1,575,314

UNITED STATES PATENT OFFICE.

AURIL BOUSQUET, OF SOUTHBRIDGE, MASSACHUSETTS.

TOOL HOLDER.

Application filed September 19, 1924. Serial No. 738,722.

*To all whom it may concern:*

Be it known that I, AURIL BOUSQUET, a citizen of Canada, residing at Southbridge, in the county of Worcester and State of Massachusetts, have invented a new and useful Tool Holder, of which the following is a specification.

This invention relates to a tool holder for a lathe or similar tool.

The principal objects of the invention are to provide a tool holder which can always be set in the tool rest with its shank in a horizontal position and with its edges in a position perpendicular to the axis of the work and to arrange it so that different kinds of tools can be set in the tool holder without changing the position of the tool holder relative to the work or post; to provide this tool holder with means for supporting a turning tool in right handed position, or in left handed position, a boring tool or a cutting off tool all in small compass and without, as stated above, changing the position of the tool holder or tool post; and also to provide a gauge for locating the carriage longitudinally especially adapted for use with a cutting off tool.

Other objects and advantages of the invention will appear hereinafter.

Reference is to be had to the accompanying drawings, in which

Fig. 1 is a plan of a tool holder constructed in accordance with this invention, showing it as carrying a cutting off tool and illustrating in dotted lines the action of the gauge;

Fig. 2 is a side view of the same;

Fig. 3 is a plan of the tool holder showing a boring tool mounted therein;

Fig. 4 is a plan of it showing a turning tool in full lines in position in the holder and illustrating in dotted lines the position of a turning tool of the opposite hand;

Fig. 5 is a plan of the lower jaw of the tool holder with the upper jaw removed;

Fig. 6 is a bottom plan of the upper jaw;

Fig. 7 is a side view opposite that shown in Fig. 2, with the jaws separated and without any tools in position;

Fig. 8 is a sectional view through the jaws back of the cross grooves.

I have shown the tool holder as having a shank 10 adapted to be set horizontally in a tool post 11 and secured in fixed position therein. This shank is offset from the lower jaw 12, which is integral with it, so that when the lower jaw is arranged with its side walls perpendicular to the axis of the work, as shown in Fig. 1, the shank 10 will be located at an angle thereto. This angle is intended to be permanent, that is to say, when the tool is set in position, as shown in Fig. 1 for use with a cutting off tool 13, it is kept in that position for use with the other tools for which it is adapted, as will appear.

This bottom jaw 12, as has been mentioned, is provided with two diagonal cross slots 14 and 15 crossing each other at angles only slightly less than right angles and both of them located in front of the perforation 16 which receives the clamping bolt 17. This jaw is also provided with a transverse horizontal semi-cylindrical groove 18 extending clear across it back of the perforation 16. In the side of this jaw is a longitudinal groove 19 which extends throughout the length of the jaw and is arranged vertically and undercut a little at the bottom.

This lower jaw is intended to co-operate with a separate upper jaw 22. This upper jaw has a pair of grooves 24 and 25 arranged like the grooves 14 and 15 so as to co-operate with them when it is turned over from the position shown in Fig. 6 to that shown in Fig. 7 which is the operative position. It is also provided with a perforation 26 to register with the perforation 16 and with a semi-cylindrical transverse groove 28 to co-operate with the groove 18 and from a cylindrical passage. It also has on one side a longitudinal groove 29 which co-operates with the groove 19 on the other jaw to complete the holding means for the cutting tool 13. This cutting tool is beveled on one or both edges and one or both of these grooves 19 and 29 is beveled accordingly so as to hold the cutting off tool in position on the side of the tool holder, as shown in Fig. 1. Its cutting front edge projects from the front of it and the tool is exactly perpendicular to the axis of the work W.

The inner end of the shank 10 is provided with a projection 30 and a slot 31. The slot extends clear across it under the projection. The end of the upper jaw 22 is provided with a projection 32 adapted to fit into the slot 31. This slot and projection are arranged parallel to the axis of the work and this constitutes a means for holding the upper jaw in position and enabling it to have a loose pivotal action. The jaws are held in fixed position relative to each other by the bolt 17 passing through the perforations 16 and 26 and are clamped together so as to hold any of the tools that are put in them, as for example, the cutting off tool 13 previously referred to.

If a turning tool 33 is to be used for turning one way it is put in one of the diagonal slots and clamped in position shown in full lines in Fig. 4. If the opposite handed turning tool 34 is to be used it is put in the other diagonal slot and clamped in position, as shown in dotted lines in Fig. 4. When it is desired to employ a boring tool 35, it is put into the cylindrical perforation formed by the two grooves 18 and 28 and the bolt 17 clamped down. In Fig. 3 I have shown a small size boring tool 35 located in a split bushing 36 held in this way, but a boring tool having a shank the size of the bushing can also be held.

For co-operation with the cutting off tool I have provided a headed stud 37 on the side of the lower jaw 12. On the shank of this stud is mounted a longitudinally slotted plate 38 which can be moved back and forth on the stud without disengaging it. This plate is provided with a gauge screw 39 having a check nut 40 on it passing through the plate to hold the gauge screw in adjusted position. This screw is turned on the stud to engage the work as indicated in dotted lines in Fig. 1 to show just how far to move the carriage to bring the cutting off tool to the right position relative to the work. When not in use, this gauge is thrown back to the position shown in Fig. 1, where the end of the screw rests on top of the upper jaw, where it is entirely out of the way.

In this way the same tool holder can be used with several different tools and can be set up once for all in the right position so that when the tools are applied to it they also are in the right position for effective operation. This does away with the necessity for the operator to keep loosening the tool holder in the tool post and changing its angle and yet the best class of work is secured. The tools, of course, will be sharpened so as to adapt them to be used in these particular positions. They are so located as to prevent chattering.

Although I have illustrated and described only a single form of the invention and shown only a definite number of ways of mounting tools on it, I am aware of the fact that other tools can be employed in connection with a tool holder constructed in accordance with this principle and that other modifications in details of construction can be made also without departing from the scope of the invention as expressed in the claims.

Therefore I do not wish to be limited in these respects but what I do claim is:—

1. In a cutting off tool, the combination with a pair of horizontal jaws having opposite grooves along one edge for receiving a cutting off blade, the tool having a shank for holding it in a tool post, and a horizontal headed pivot stud on the opposite side of one jaw, of a longitudinally slotted plate pivoted on the stud and located parallel with the blade so as to be adjustable longitudinally, and a gauge screw mounted on the plate, whereby the plate can be moved to bring the screw to the front of the tool, the screw being adjustable to bring it into contact with a surface parallel with the blade to act as a gauge.

2. In a cutting off tool, the combination with a pair of jaws having opposite grooves along one edge for receiving a cutting off blade, the tool having a shank for holding it in a tool post, and a pivot stud on the opposite side of one jaw, of a plate pivoted on the stud, and a gauge screw mounted on the plate, whereby the plate can be moved to bring the screw to the front of the tool, the screw being adjustable to bring it into contact with a surface to act as a gauge, the shank having a surface for supporting said screw when turned back to inoperative position.

3. In a cutting off tool, the combination with a pair of jaws having opposite grooves along one edge for receiving a cutting off blade, the tool having a shank for holding it in a tool post, and a pivot stud on the opposite side of one jaw, of a longitudinally slotted plate pivoted on the stud and located parallel with the blade so as to be adjustable longitudinally, and a gauge screw mounted on the slotted plate, whereby the plate can be moved to bring the screw to the front of the tool, the screw being adjustable to bring it into contact with a surface parallel with the blade to act as a gauge.

4. As an article of manufacture, a tool holder comprising a jaw having a shank extending therefrom at an angle and adapted to be set in the tool post so that the jaw will be located with its sides perpendicular to the axis of the work to be operated upon, a loose jaw adapted to rest against the first named jaw, means for securing the loose jaw against the other jaw, both of said jaws having grooves located longitudinally along the sides of the two jaws and being adapted to hold the top and bottom edges of a cutting off tool, and a stop gauge pivotally mounted on the lower jaw comprising a slotted plate with a screw parallel to the axis of the work adjustably mounted thereon.

In testimony whereof I have hereunto affixed my signature.

AURIL BOUSQUET.